United States Patent
Yang

(10) Patent No.: US 9,362,821 B2
(45) Date of Patent: Jun. 7, 2016

(54) POWER SYSTEM AND CONTROL METHOD THEREOF

(71) Applicant: Shenzhen China Star Optoelectronics Technology Co., Ltd., Shenzhen, Guangdong (CN)

(72) Inventor: Xueliang Yang, Shenzhen (CN)

(73) Assignee: Shenzhen China Star Optoelectronics Technology Co., Ltd, Shenzhen, Guangdong (CA)

( * ) Notice: Subject to any disclaimer, the term of this patent is extended or adjusted under 35 U.S.C. 154(b) by 219 days.

(21) Appl. No.: 13/819,602

(22) PCT Filed: Feb. 6, 2013

(86) PCT No.: PCT/CN2013/071474
§ 371 (c)(1),
(2) Date: Mar. 18, 2014

(87) PCT Pub. No.: WO2014/121472
PCT Pub. Date: Aug. 14, 2014

(65) Prior Publication Data
US 2014/0218002 A1  Aug. 7, 2014

(30) Foreign Application Priority Data
Feb. 5, 2013 (CN) .......................... 2013 1 0046005

(51) Int. Cl.
*H02M 1/00* (2006.01)
*H02M 3/156* (2006.01)
*H02M 1/32* (2007.01)

(52) U.S. Cl.
CPC ............... *H02M 3/156* (2013.01); *H02M 1/32* (2013.01); *H02M 2001/0009* (2013.01)

(58) Field of Classification Search
CPC ..... H02M 3/06; H02M 3/33546; H02M 3/335; H02M 2001/0009
See application file for complete search history.

(56) References Cited

U.S. PATENT DOCUMENTS

| | | | |
|---|---|---|---|
| 2004/0008528 A1* | 1/2004 | Umemoto | H02M 3/1588 363/49 |
| 2006/0290333 A1* | 12/2006 | Fukushi | H02M 1/32 323/277 |
| 2008/0197821 A1* | 8/2008 | Hasegawa | H02M 3/156 323/238 |
| 2010/0066333 A1* | 3/2010 | Noda | H02M 3/156 323/282 |

(Continued)

FOREIGN PATENT DOCUMENTS

| CN | 101232254 A | 7/2010 |
|---|---|---|
| CN | 102570837 A | 7/2012 |

*Primary Examiner* — Jessica Han
*Assistant Examiner* — Bart Iliya
(74) *Attorney, Agent, or Firm* — Andrew C. Cheng

(57) ABSTRACT

The present invention provides a power system and controlling method thereof. The power system includes: pulse width modulation (PWM) power source, voltage detection unit, current detection unit and feedback signal generation unit. PWM power source receives external DC input, performs PWM on received external DC input, and supplies PWM output obtained through PWM from the DC output terminal to a device expecting power supply. Voltage detection unit detects voltage amplitude of PWM output. Current detection unit detects current amplitude of PWM output. Feedback signal generation unit generates feedback signal and supplies generated feedback signal to PWM power source. PWM power source adjusts the voltage amplitude and current amplitude of the PWM output based on the received feedback signal.

7 Claims, 2 Drawing Sheets

(56) References Cited

U.S. PATENT DOCUMENTS

| | | | | |
|---|---|---|---|---|
| 2012/0119671 A1* | 5/2012 | Nietfeld | ............ | H05B 33/0815 315/291 |
| 2013/0002218 A1* | 1/2013 | Thomas | ................ | H02M 3/156 323/282 |
| 2013/0265024 A1* | 10/2013 | Chen | ........................ | H02M 1/08 323/282 |
| 2013/0328540 A1* | 12/2013 | Kung | ..................... | H02M 3/158 323/311 |
| 2014/0160799 A1* | 6/2014 | Gu | ........................ | H02M 3/156 363/17 |

* cited by examiner

POWER SYSTEM AND CONTROL METHOD THEREOF

BACKGROUND OF THE INVENTION

1. Field of the Invention

The present invention relates to the field of power system and control method thereof, and in particular to a pulse width modulation (PWM) power system and control method thereof.

2. The Related Arts

The known DC-DC power supply structure comprises a constant-voltage output PWM power system able to output a voltage with constant amplitude. In such a system, when the load increases, the constant-voltage output PWM power system can adjust the PWM output so that the amplitude of the DC output current increases as the load increases.

FIG. 4 is a schematic view showing the structure of a known constant-voltage output PWM power system 400.

As shown in FIG. 4, the known PWM power system 400 comprises a PWM power source 410, a voltage detection unit 430 and a feedback signal generation unit 450. The PWM power source 410 receives DC input, such as, DC input voltage with 12V amplitude, from external current source through DC input terminal IN, performs PWM on the received DC input and supplies the PWM output (DC output) through DC output terminal OUT to a device expecting power supply. The voltage detection unit 430 detects the voltage amplitude Vout of the PWM output. The feedback signal generation unit 450 generates a feedback signal based on the voltage amplitude Vout detected by the voltage detection unit 430, and supplies the generated feedback signal to the feedback signal input terminal FB of the PWM power source 410. The PWM power source 410 maintains the voltage amplitude of the PWM output based on the feedback signal received by the feedback signal input terminal FB, such as, maintaining the voltage amplitude Vout as 17V for the PWM output, and amplifies the current amplitude Iout of the PWM output.

In known technique, the problem of the constant-voltage output PWM power system is that when the current amplitude of the PWM output increases, the efficiency and stability of the constant-voltage output PWM power system may be affected. For example, when the load connected to the constant-voltage output PWM power system increases, and the voltage amplitude Vout of the PWM output from the constant-voltage output PWM power system remains the same, the current amplitude Iout of the PWM output will greatly increase so that the circuit loss of the constant-voltage output PWM power system will greatly increase, and the temperatures of the components of the constant-voltage output PWM power system, such as, IC chips, and the load or supplied devices may also increase, more power is consumed and efficiency is lowered. As a result, the stability of the loop formed by the constant-voltage output PWM power system and the load or supplied device becomes poor.

SUMMARY OF THE INVENTION

The technical issue to be addressed by the present invention is to provide a power system and control method thereof, able to guarantee constant output power and reduce output current so as to reduce the power loss due to thermal conversion and reduce the temperature of the power system and the supplied devices.

The present invention provides a power system, which comprises: a pulse width modulation (PWM) power source, comprising a DC input terminal, a feedback signal input terminal and a DC output terminal, the PWM power source being configured to receive external DC input from the DC input terminal, perform PWM on received external DC input, and supply PWM output obtained through PWM from the DC output terminal to a device expecting power supply; a voltage detection unit, configured to detect a voltage amplitude of a PWM output; a current detection unit, configured to detect a current amplitude of a PWM output; a feedback signal generation unit, configured to generate a feedback signal based on the voltage amplitude detected by the voltage detection unit and the current amplitude detected by the current detection unit, and supply the generated feedback signal to the feedback signal input terminal of the PWM power source; wherein the PWM power source adjusting the voltage amplitude and current amplitude of the PWM output based on the feedback signal received by the feedback signal input terminal.

According to a preferred embodiment of the present invention, in response to the current detection unit detecting the current amplitude of the PWM output greater than a predefined current, the feedback signal generation unit can generate a second feedback so that the PWM power source can receive the second feedback signal from the feedback signal input terminal to reduce the current amplitude of the PWM output.

According to a preferred embodiment of the present invention, the feedback signal generation unit can generate the second feedback signal based on a signal indicating the voltage amplitude of the PWM output received from the voltage detection unit and a signal indicating the current amplitude of the PWM output received from the current detection unit.

According to a preferred embodiment of the present invention, the PWM power source can increase the voltage amplitude of the PWM output to maintain constant power of the PWM output based on the second feedback signal received by the feedback signal input terminal.

According to a preferred embodiment of the present invention, in response to the current detection unit detecting the current amplitude of the PWM output less than or equal to a predefined current, and the voltage detection unit detecting the voltage amplitude of the PWM output not equal to a predefined voltage, the feedback signal generation unit can generate a first feedback so that the PWM power source can receive the first feedback signal from the feedback signal input terminal to adjust the voltage amplitude of the PWM output to be equal to the predefined voltage.

According to a preferred embodiment of the present invention, the feedback signal generation unit can generate the first feedback signal based on a signal indicating the voltage amplitude of the PWM output received from the voltage detection unit.

According to a preferred embodiment of the present invention, the PWM power source can increase the current amplitude of the PWM output based on the first feedback signal received by the feedback signal input terminal.

According to a preferred embodiment of the present invention, the voltage detection unit comprises a dividing resistor set connected between the DC output terminal and the ground of the PWM power source, the dividing resistor set can further comprise a first resistor and a second resistor, serially connected; the current detection unit comprises a third resistor connected between the DC output terminal of the PWM power source and the device expecting power supply; and the feedback signal generation unit comprises a first amplifier, a second amplifier, a third amplifier, a fourth amplifier, a first switch and a second switch.

According to a preferred embodiment of the present invention, an input terminal of the first amplifier is connected to the common node between the first resistor and the second resistor, the other input terminal of the first amplifier is connected to a reference voltage source; two input terminals of the second amplifier are connected respectively to two terminals of the third resistor; an input terminal of the third amplifier is connected to the output terminal of the second amplifier, the other input terminal of the third amplifier is connected to the reference voltage source; the control terminal of the first switch is connected to the output terminal of the third amplifier, the first terminal of the first switch is connected to the output terminal of the second amplifier; an input terminal of the fourth amplifier is connected to the output terminal of the first amplifier, the other input terminal of the fourth amplifier is connected to the second terminal of the first switch, the output terminal of the fourth amplifier is connected to the feedback signal input terminal of the PWM power source; the control terminal of the second switch is connected to the output terminal of the third amplifier; the first terminal of the second switch is connected to the input terminal of the fourth amplifier, which is connected to the second terminal of the first switch, the second terminal of the second switch is connected to the output terminal of the fourth amplifier.

According to a preferred embodiment of the present invention, in response to the current detection unit detecting the current amplitude of the PWM output less than or equal to a predefined current, the first switch can be cut off, and the second switch can be conductive; at this point, the fourth amplifier operates as a source follower to supply an output identical to the output of the first amplifier as the feedback signal to the feedback signal input terminal of the PWM power source; in response to the current detection unit detecting the current amplitude of the PWM output greater than a predefined current, the first switch can be conductive, and the second switch can be cut off; at this point, the fourth amplifier operates as a differential amplifier to amplify the difference between the output of the first amplifier and the output of the second amplifier and supplies as the feedback signal to the feedback signal input terminal of the PWM power source.

The present invention provides a method of controlling power system, which comprises the following steps of: performing pulse width modulation (PWM) on an external DC input, and supplying a PWM output obtained from the PWM to a device expecting power supply; detecting a voltage amplitude and a current amplitude of the PWM output; generating a feedback signal based on the detected voltage amplitude and the current amplitude; and adjusting the voltage amplitude and the current amplitude of the PWM output based on the feedback signal.

According to a preferred embodiment of the present invention, the step of generating a feedback signal can further comprises: in response to detecting the current amplitude of the PWM output greater than a predefined current, generating a second feedback; the step of adjusting the PWM output can further comprise: reducing the current amplitude of the PWM output based on the second feedback signal.

According to a preferred embodiment of the present invention, the second feedback signal is generated based on a signal indicating the voltage amplitude of the PWM output and a signal indicating the current amplitude of the PWM output.

According to a preferred embodiment of the present invention, the step of adjusting the PWM output can further comprise: increasing the voltage amplitude of the PWM output based on the second feedback signal to maintain constant power of PWM output.

According to a preferred embodiment of the present invention, the step of generating a feedback signal can further comprises: in response to detecting the current amplitude of the PWM output less than or equal to a predefined current, and detecting the voltage amplitude of the PWM output not equal to a predefined voltage, generating a first feedback; the step of adjusting the PWM output can further comprise: adjusting the voltage amplitude of the PWM output to be equal to the predefined voltage based on the first feedback signal.

According to a preferred embodiment of the present invention, the second feedback signal is generated based on a signal indicating the voltage amplitude of the PWM output.

According to a preferred embodiment of the present invention, the step of adjusting the PWM output can further comprise: increasing the current amplitude of the PWM output based on the first feedback signal.

The present invention provides a computer readable recording medium, which records an executable program of a method for controlling power system, the method comprising: performing pulse width modulation (PWM) on an external DC input, and supplying a PWM output obtained from the PWM to a device expecting power supply; detecting a voltage amplitude and a current amplitude of the PWM output; generating a feedback signal based on the detected voltage amplitude and the current amplitude; and adjusting the voltage amplitude and the current amplitude of the PWM output based on the feedback signal.

Through the following detailed description, drawings and claims, the features and other aspects of the present invention will be clear.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

For description of the technical means and result of the present invention, the following refers to the drawings and embodiments for detailed description, wherein the same number indicates the same part. For clarity and convenience, the sizes of the elements may be adjusted to emphasize the description. The description of commonly known structures and functions may be omitted to facilitate clarity and understanding.

Figure 1:
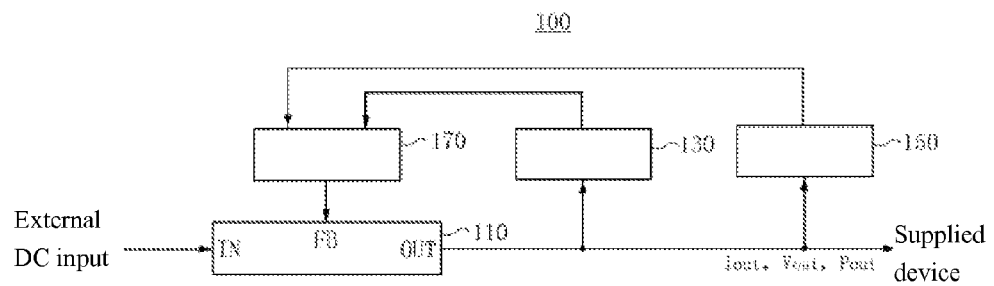
FIG. 1 is a schematic view showing the structure of a power system according to an exemplary embodiment of the present invention.

FIG. 1 is a schematic view showing the structure of a power system 100 according to an exemplary embodiment of the present invention.

Referring to FIG. 1, the power system 100 comprises: a pulse width modulation (PWM) power source 110, a voltage detection unit 130, a current detection unit 150 and a feedback signal generation unit 170.

The PWM power source 110 comprises a DC input terminal IN, a feedback signal input terminal FB and a DC output terminal OUT. The DC input terminal IN is connected to an external DC power source to receive external DC input. The external DC power source can be, such as, DC input with voltage amplitude 12V.

The PWM power source 110 is configured to perform PWM on received external DC input received by the DC input terminal IN, and supply PWM output obtained through PWM from the DC output terminal OUT to a device expecting power supply.

The PWM power source 110 is also configured to adjust the current amplitude Iout, voltage amplitude Vout and/or power Pout of the PWM output, based on the feedback signal received by the feedback signal input terminal FB from the feedback signal generation unit 170. The following describes the specifics.

The voltage detection unit 130 is configured to detect a voltage amplitude Vout of a PWM output. As shown in FIG. 1, the voltage detection unit 130 can supply a signal indicating the detected voltage amplitude Vout of the PWM output to the feedback signal generation unit 170.

The current detection unit 150 is configured to detect a current amplitude Iout of a PWM output. As shown in FIG. 1, the current detection unit 150 can supply a signal indicating the detected current amplitude Iout of the PWM output to the feedback signal generation unit 170.

The feedback signal generation unit 170 is configured to generate a feedback signal based on the voltage amplitude Vout detected by the voltage detection unit 130 and the current amplitude detected Iout by the current detection unit 150, and supply the generated feedback signal to the feedback signal input terminal FB of the PWM power source 110. As shown in FIG. 1, the feedback signal generation unit 170 can receive the signal indicating the detected voltage amplitude Vout of the PWM output from the voltage detection unit 130, and receive the signal indicating the detected current amplitude Iout of the PWM output from the current detection unit 150. Therefore, the feedback signal generation unit 170 can generate a feedback signal based on the received signal indicating the detected voltage amplitude Vout of the PWM output and the received signal indicating the detected current amplitude Iout of the PWM output. In an exemplary embodiment, the feedback signal generation unit 170 can selectively generate a first feedback signal and a second feedback signal based on the voltage amplitude Vout and current amplitude Iout of the PWM output. The following describes the specifics.

The PWM power source 110 can adjust the PWM output based on the different feedback signals received from the feedback signal input terminal FB and generated by the feedback signal generation unit 170. For example, the PWM power source 110 can adjust the voltage amplitude Vout, current amplitude Iout and/or power Pout of the PWM output based on the feedback signal. In an exemplary embodiment, the PWM power source 110 can maintain the voltage amplitude Vout of the PWM output constant based on the first feedback signal, and the PWM power source 110 can decrease the current amplitude Iout of the PWM output and/ or maintain the power out of the PWM output constant based on the second feedback signal.

When using the above power system 100 to supply power to a device (i.e., load), the voltage amplitude Vout and/or the current amplitude Iout of the PWM output with fixed power Pout will change according to the load. For example, when the load increases, such as, when the impedance of the device and/or the power supply cable connecting the power system 100 and the device increases), the voltage amplitude Vout of the PWM output may be decrease. Therefore, according to the present invention, by detecting the voltage amplitude Vout and the current amplitude Iout of the PWM output, the PWM output can be adjusted based on the detection result so as to supply power to the device properly.

Based on an exemplary embodiment, in response to the voltage detection unit 130 detecting the voltage amplitude Vout of the PWM output not equal to a predefined voltage Vth, the feedback signal generation unit 170 can generate the first feedback and supply the first feedback signal to the feedback signal input terminal FB of the PWM power source 110. The PWM power source 110 can adjust the voltage amplitude Vout of the PWM output to be equal to the predefined voltage Vth based on the first feedback signal received from the feedback signal input terminal FB.

For example, the predefine voltage Vth can be 15V. When the voltage amplitude Vout of the PWM output drops from 15V to 14V because of the increased load, the voltage detection unit 130 can output a signal indicating that the voltage amplitude Vout of the PWM output is currently 14V to the feedback signal generation unit 170. The feedback signal generation unit 170 can generate the first feedback signal according to the signal indicating that the voltage amplitude Vout of the PWM output is currently 14V, and supply the first feedback signal to the feedback signal input terminal FB of the PWM power source 110. At this point, the PWM power source 110 can increase the voltage amplitude Vout of the PWM output from 14V to 15V based on the first feedback signal received from the feedback signal input terminal FB, in other words, equal to the predefined voltage Vth. In addition, in the instant embodiment, the PWM power source 110 can also increase the current amplitude Iout of the PWM output based on the first feedback signal received from the feedback signal input terminal FB, such as, increasing from 1 Amp to 1.1 Amp.

As described below, because the current amplitude Iout of the PWM output does not exceed the predefined current Ith (e.g., 1.1 Amp), the feedback signal generation unit 170 can generate the first feedback signal based only on the signal indicating the voltage amplitude of the PWM output received from the voltage detection unit 130.

In the instant embodiment, the predefined voltage Vth can be a preset value, or an adjustable value according to the actual operation of the power system and/or device. The following describes the specifics.

In another exemplary embodiment, in response to the current detection unit 150 detecting the current amplitude Iout of the PWM output greater than a predefined current Ith, the feedback signal generation unit 170 can generate a second feedback supply the second feedback signal to the feedback signal input terminal FB of the PWM power source 110. The PWM power source 110 can reduce the current amplitude Iout of the PWM output based on the second feedback signal received from the feedback signal input terminal FB, such as, reducing the current amplitude Iout of the PWM output to be less than or equal to the predefined current Ith.

For example, the predefined current Ith can be 1 Amp. When the current amplitude Iout of the PWM output increases from 1 Amp to 1.1 Amp because of the increased load, the current detection unit 150 can output a signal indicating that the current amplitude Iout of the PWM output is currently 1.1 Amp to the feedback signal generation unit 170. The feedback signal generation unit 170 can generate the second feedback signal according to the signal indicating that the current amplitude Iout of the PWM output is currently 1.1 Amp received from the current detection unit 150 and the signal indicating the voltage amplitude Vout of the PWM output received from the voltage detection unit 130, and supply the second feedback signal to the feedback signal input terminal FB of the PWM power source 110. At this point, the voltage amplitude of the PWM output can be 15V. The PWM power source 110 can decrease the current amplitude Iout of the PWM output from 1.1 Amp to 1 Amp based on the second feedback signal received from the feedback signal input terminal FB, in other words, equal to the predefined current Ith. In addition, in the instant embodiment, the PWM power source 110 can also increase the voltage amplitude Vout of the PWM output based on the second feedback signal received from the feedback signal input terminal FB, such as, increasing from 15V to 16.5V, to maintain constant power Pout (e.g., 16.5 W) of the PWM output.

In the instant embodiment, the predefined current Ith can be a preset value, or an adjustable value according to the actual operation of the power system and/or device. The following describes the specifics.

Therefore, the power system of the embodiment can maintain the voltage amplitude Vout of the PWM output constant under the circumstance that the current amplitude Iout of the PWM output less than or equal to the predefined current Ith, and can reduce the current amplitude Iout of the PWM output to be less than or equal to the predefined current Ith when the current amplitude Iout of the PWM output to be greater than the predefined current Ith. Hence, the heat generated by the operation of the supplied device and the heat generated by the operation of the power system 100 can be both reduced. As a result, the temperature of the power system 100 and the supplied device is reduced. As such, the power loss caused by heat is reduced and the life span of the power system 100 and the supplied device is increased.

Figure 2:
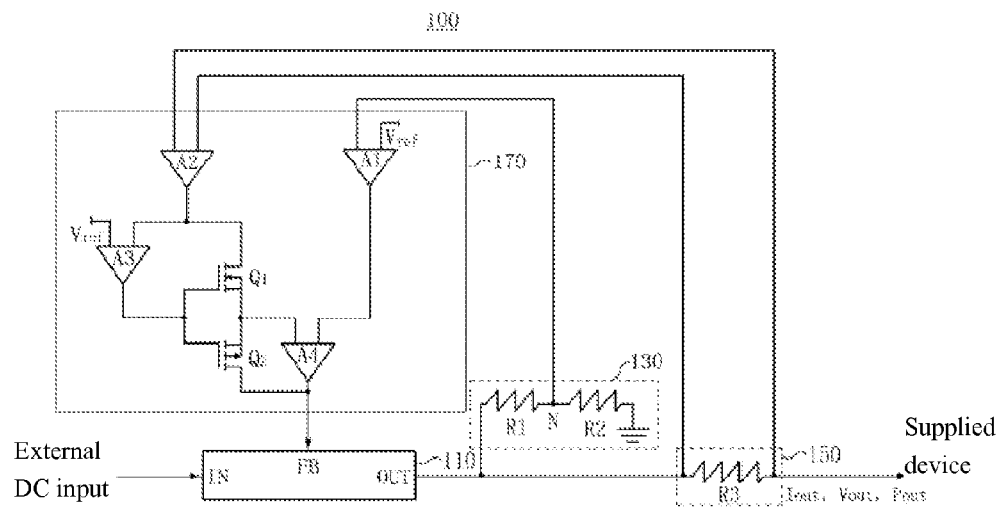
FIG. 2 is a schematic view showing the structure of a power system according to an exemplary embodiment of the present invention, wherein the structure of the circuit of the feedback signal generation unit is indicated.

FIG. 2 is a schematic view showing the structure of a power system according to an exemplary embodiment of the present invention, wherein the voltage detection unit 130, current detection unit 150 and feedback signal generation unit 170 are shown.

As shown in FIG. 2, the voltage detection unit 130 can further comprise a dividing resistor set connected between the DC output terminal OUT and the ground of the PWM power source 110, wherein the dividing resistor set can further comprise a first resistor R1 and a second resistor R2, serially connected. The current detection unit 150 can further comprise a third resistor R3 connected between the DC output terminal OUT of the PWM power source 110 and the device expecting power supply. The feedback signal generation unit 170 can further comprise a first amplifier A1, a second amplifier A2, a third amplifier A3, a fourth amplifier A4, a first switch Q1 and a second switch Q2.

An input terminal of the first amplifier A1 is connected to the common node N between the first resistor R1 and the second resistor R2, and the other input terminal of the first amplifier A1 is connected to a reference voltage source Vref. The two input terminals of the second amplifier A2 are connected to the two terminal of the third resistor R3.

An input terminal of the third amplifier A3 is connected to the output terminal of the second amplifier A2, and the other input terminal of the third amplifier A3 is connected to the reference voltage source Vref. The control terminal of the first switch Q1 is connected to the output terminal of the third amplifier A3, and the first terminal of the first switch Q1 is connected to the output terminal of the second amplifier A2. An input terminal of the fourth amplifier A4 is connected to the output terminal of the first amplifier A1, the other input terminal of the fourth amplifier A4 is connected to the second terminal of the first switch Q1, and the output terminal of the fourth amplifier A4 is connected to the feedback signal input terminal FB of the PWM power source 110. The control terminal of the second switch Q2 is connected to the output terminal of the third amplifier A3. The first terminal of the second switch Q2 is connected to the input terminal of the fourth amplifier A4 which is connected to the second terminal of the first switch Q1, and the second terminal of the second switch Q2 is connected to the output terminal of the fourth amplifier A4.

According to the instant embodiment, when the current amplitude Iout of the PWM output is less than or equal to a predefined current Ith, the first switch Q1 can be cut off, and the second switch Q2 can be conductive. When the first switch Q1 is cut off, and the second switch Q2 is conductive, the output terminal of the fourth amplifier A4 is connected to an input terminal. At this point, the fourth amplifier A4 operates as a source follower. Therefore, the feedback signal generation unit 170 can disregard the signal indicating the current amplitude Iout of the PWM output received from the current detection unit 150, generate the first feedback based only on the signal indicating the voltage amplitude Vout of the PWM output received from the voltage detection unit 130, and then supply the first feedback signal through the output terminal of the fourth amplifier A4 to the feedback signal input terminal FB of the PWM power source 110.

On the other hand, when the current amplitude Iout of the PWM output is greater than a predefined current Ith, the first switch Q1 can be conductive, and the second switch Q2 can be cut off. When the first switch Q1 is conductive and the second switch Q2 is cut off, the output terminal of the fourth amplifier A4 can be cut off connection to an input terminal. Therefore, the feedback signal generation unit 170 can generate the second feedback based on the signal indicating the current amplitude Iout of the PWM output received from the current detection unit 150 and the signal indicating the voltage amplitude Vout of the PWM output received from the voltage detection unit 130, and then supply the second feedback signal through the output terminal of the fourth amplifier A4 to the feedback signal input terminal FB of the PWM power source 110.

In an actual embodiment, the voltage amplitude Vout of the PWM output can be 15V, the predefined current Ith can be set as 1 A, the resistance of the third resistor R3 can be 1 ohm and the reference voltage Vref can be set as 1V.

When the current amplitude Iout of the PWM output is less than the predefined current Ith (1 A), such as, when the current amplitude Iout of the PWM output is 0.5 A, the voltage difference between the input terminals of the second amplifier A2 can be 0.5V. Therefore, the output of the second amplifier A2 can be 0.5V. The inputs of the third amplifier A3 can be the output (0.5V) of the second amplifier A2 and the reference voltage Vref (1V). Because the output (0.5V) of the second amplifier A2 is less than the reference voltage Vref (1V), the output of the third amplifier A3 can be 0V. At this point, the first switch Q1 can be cut off and the second switch Q2 can be conductive. When the second switch Q2 is conductive, the fourth amplifier A4 can be used as a source-follower. Therefore, the voltage of the feedback signal (i.e., the first feedback signal) received by the feedback signal input terminal FB of the PWM power source 110 can be only affected by the output of the first amplifier A1. In other words, the first amplifier A1 configured to operate according to the voltage at node N and the voltage of reference voltage Vref can be of known technique, and the first feedback signal can be generated according to the known technique and in response to the first feedback signal, the voltage amplitude of the PWM output remains constant. Therefore, the description is omitted here. For example, the PWM power source 110 can maintain the voltage amplitude of the PWM output at 15V in response to the 1V first feedback signal. In addition, in the instant embodiment, the resistance of the first resistor R1 can be 140 KΩ, the output of the first amplifier A1 can be 1V, the input and the output of the fourth amplifier A4 can be the same, such as, 1V.

When the current amplitude Iout of the PWM output is greater than the predefined current Ith (1 A), such as, when the current amplitude Iout of the PWM output is 1.1 A, the voltage difference between the input terminals of the second amplifier A2 can be 1.1V. Therefore, the output of the second amplifier A2 can be 1.1V. The inputs of the third amplifier A3 can be the output (1.1V) of the second amplifier A2 and the reference voltage Vref (1V). Because the output (1.1V) of the second amplifier A2 is greater than the reference voltage Vref (1V), the output of the third amplifier A3 can be 5V. At this point, the first switch Q1 can be conductive and the second switch Q2 can be cut off. When the second switch Q2 is cut off, the fourth amplifier A4 can be used as a differential amplifier. Therefore, the voltage of the feedback signal (i.e., the second feedback signal) received by the feedback signal input terminal FB of the PWM power source 110 can be affected by difference between the output of the first amplifier A1 and the output of the second amplifier A2. Assume that the current output has yet responded to the increase of the current, and the output of the power source is temporary at 15V at this point. The above example shows that the output of the first amplifier A1 is 1V, and the output of the first amplifier A1 (1V) is different from the output of the second amplifier A2. The fourth amplifier A4 will amplify the difference between the output of the first amplifier A1 and the output of the second amplifier A2, whose output is set to be 1.36V. therefore, in response to the 1.36V second feedback signal, the PWM power source 110 can adjust the voltage amplitude of the PWM output (for example, increase) to 16.5V and lower the current amplitude to 1 A to maintain power Pout of the PWM output constant. In addition, in the instant embodiment, the resistance of the first resistor R1 can be 140 KΩ, the resistance of the second resistor R2 can be 10 KΩ, and the output of the fourth amplifier A4 can be 1.36V.

The PWM power source 110 can adjust the current amplitude Iout, voltage amplitude Vout and/or power Pout of the PWM output based on the first feedback signal and the second feedback signal according to the known technique, and the description is omitted here.

Figure 3:
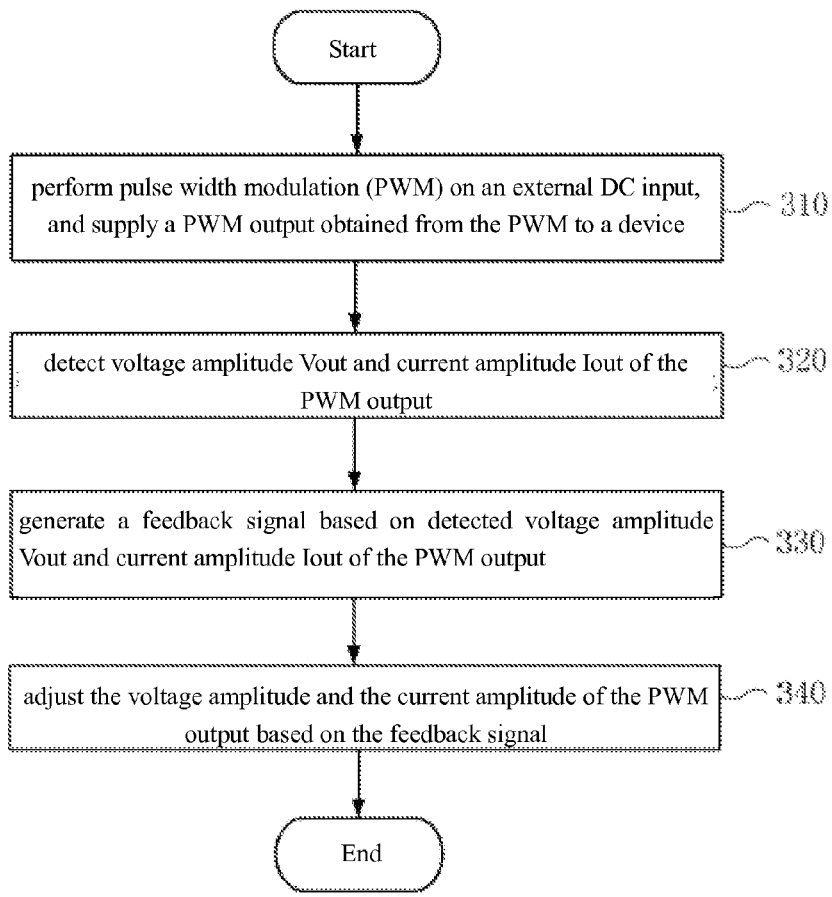
FIG. 3 is a flowchart of the method of controlling the power system according to an exemplary embodiment of the present invention.
Figure 4:
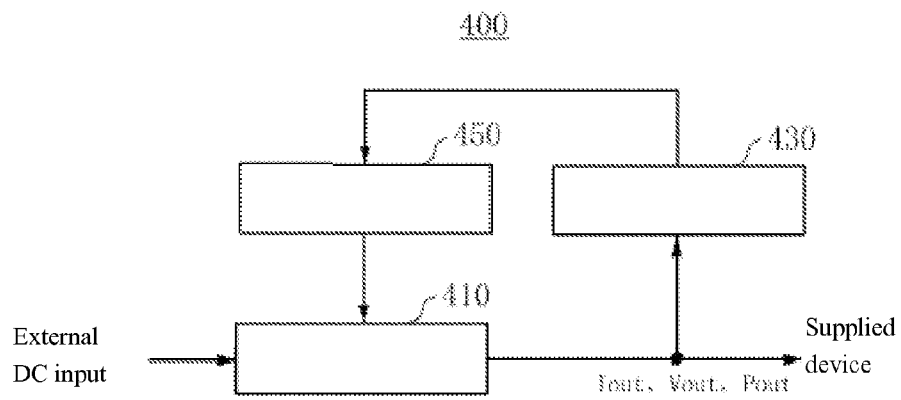
FIG. 4 is a schematic view showing the structure of a known constant-voltage output PWM power system.

FIG. 3 is a flowchart of a method 300 of controlling the power system according to an exemplary embodiment of the present invention. The method of controlling power system shown in FIG. 3 can be applied to the power system 100 described in FIG. 1 and FIG. 2.

As shown in FIG. 3, the first step is to perform pulse width modulation (PWM) on an external DC input, and supply a PWM output obtained from the PWM to a device expecting power supply (step 310). Then, the next step is to detect a voltage amplitude and a current amplitude of the PWM output (step 320) and to generate a feedback signal based on the detected voltage amplitude and the current amplitude (step 330). Finally, step 340 is to adjust the voltage amplitude and the current amplitude of the PWM output based on the feedback signal (Step 340).

For example, in step 330, in response to detecting the voltage amplitude Vout of the PWM output greater than a predefined voltage Vth, the first feedback signal can be generated, and in response to detecting the current amplitude Iout of the PWM output greater than a predefined current Ith, the second feedback signal can be generated. In an exemplary embodiment, when the current amplitude Iout of the PWM output is less than or equal to the predefined current Ith, the first feedback signal is generated based only on the signal indicating the voltage amplitude Vout of the PWM output. When the current amplitude Iout of the PWM output is greater than the predefined current Ith, the second feedback signal is generated based on both the signal indicating the voltage amplitude Vout of the PWM output and the signal indicating the current amplitude Iout of the PWM output.

Therefore, in step 340, the voltage amplitude Vout of the PWM output can be maintained constant based on the first feedback signal, such as, equal to the predefined voltage Vth; the current amplitude Iout of the PWM output can be reduced based on the second feedback signal, such as, less than or equal to the predefined current Ith. In addition, the current amplitude Iout of the PWM output can be increased based on the first feedback signal, and the voltage amplitude Vout of the PWM output can be increased based on the second feedback signal to maintain the power Pout of the PWM output constant.

Therefore, the method 300 of controlling the power system in the exemplary embodiment can maintain the voltage amplitude Vout of the PWM output constant when the current amplitude Iout of the PWM output is less than or equal to the predefined current Ith; and can reduce the current amplitude Iout of the PWM output is less than or equal to the predefined current Ith when the current amplitude Iout of the PWM output is greater than the predefined current Ith. Hence, the heat generated by the operation of the supplied device and the heat generated by the operation of the power system using the control method 300 can be both reduced. As a result, the temperature of the power system using the control method 300 and the supplied device is reduced. As such, the power loss caused by heat is reduced and the life span of the power system and the supplied device is increased.

The execution of the described method or one or more program instructions can be recorded, stored or fixed in one or more computer-readable storage medium. The medium can includes only program instructions, data files and data structure or any combination of the above. The embodiments of the computer-readable storage medium include magnetic medium (e.g., hard disk, soft disk and magnetic tape), optical medium (e.g., CD ROM, DVD), magnetic-optical medium (e.g., optical disk) and hardware device for storing and executing program instructions (e.g., ROM, RAM, Flash memory). The embodiments of the program instructions include: machine code (e.g., machine code generated by complier) and high-level code executable by decoder. The program instruction (i.e., software) can be distributed on computer system connected by networks and be stored and executed in a distributed manner, for example, through one or more computer-readable storage medium to store the software and data. In addition, the program, code and program code segment realizing the disclosed embodiments can be easily explained by those with ordinary skills in the related field in reference to the flowcharts, diagrams, drawings and descriptions. Furthermore, the execution unit can be either hardware, software or a combination of the hardware and software. For example, the unit can be package software executed on a computer or a computer able to execute software.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A power system, which comprises:
   a pulse width modulation (PWM) power source, comprising a DC input terminal, a feedback signal input terminal and a DC output terminal, the PWM power source being configured to receive external DC input from the DC input terminal, perform PWM on received external DC input, and supply PWM output obtained through PWM from the DC output terminal to a device expecting power supply;
   a voltage detection unit, configured to detect a voltage amplitude of a PWM output;
   a current detection unit, configured to detect a current amplitude of a PWM output; and
   a feedback signal generation unit, configured to generate a feedback signal based on the voltage amplitude detected by the voltage detection unit and the current amplitude detected by the current detection unit, and supply the generated feedback signal to the feedback signal input terminal of the PWM power source;
   wherein the PWM power source adjusting the voltage amplitude and current amplitude of the PWM output based on the feedback signal received by the feedback signal input terminal,
   wherein the voltage detection unit comprises a dividing resistor set connected between the DC output terminal and the ground of the PWM power source, the dividing resistor set further comprising a first resistor and a second resistor, serially connected;
   the current detection unit comprises a third resistor connected between the DC output terminal of the PWM power source and the device expecting power supply; and
   the feedback signal generation unit comprises a first amplifier, a second amplifier, a third amplifier, a fourth amplifier, a first switch and a second switch; wherein
   an input terminal of the first amplifier is connected to the common node between the first resistor and the second resistor, the other input terminal of the first amplifier is connected to a reference voltage source;
   two input terminals of the second amplifier are connected respectively to two terminals of the third resistor;
   an input terminal of the third amplifier is connected to the output terminal of the second amplifier, the other input terminal of the third amplifier is connected to the reference voltage source;
   the control terminal of the first switch is connected to the output terminal of the third amplifier, the first terminal of the first switch is connected to the output terminal of the second amplifier;
   an input terminal of the fourth amplifier is connected to the output terminal of the first amplifier, the other input terminal of the fourth amplifier is connected to the second terminal of the first switch, the output terminal of the fourth amplifier is connected to the feedback signal input terminal of the PWM power source; and
   the control terminal of the second switch is connected to the output terminal of the third amplifier; the first terminal of the second switch is connected to the input terminal of the fourth amplifier, which is connected to the second terminal of the first switch, the second terminal of the second switch is connected to the output terminal of the fourth amplifier;
   wherein
   in response to the current detection unit detecting the current amplitude of the PWM output less than or equal to a predefined current, the first switch can be cut off, and the second switch can be conductive; at this point, the fourth amplifier operates as a source follower to supply an output identical to the output of the first amplifier as the feedback signal to the feedback signal input terminal of the PWM power source; and
   in response to the current detection unit detecting the current amplitude of the PWM output greater than a predefined current, the first switch can be conductive, and the second switch can be cut off; at this point, the fourth amplifier operates as a differential amplifier to amplify the difference between the output of the first amplifier and the output of the second amplifier and supplies as the feedback signal to the feedback signal input terminal of the PWM power source.

2. The power system as claimed in claim 1, wherein, in response to the current detection unit detecting the current amplitude of the PWM output greater than a predefined current, the feedback signal generation unit can generate a second feedback so that the PWM power source can receive the second feedback signal from the feedback signal input terminal to reduce the current amplitude of the PWM output.

3. The power system as claimed in claim 2, wherein the feedback signal generation unit can generate the second feedback signal based on a signal indicating the voltage amplitude of the PWM output received from the voltage detection unit and a signal indicating the current amplitude of the PWM output received from the current detection unit.

4. The power system as claimed in claim 3, wherein the PWM power source can increase the voltage amplitude of the PWM output to maintain constant power of the PWM output based on the second feedback signal received by the feedback signal input terminal.

5. The power system as claimed in claim 4, wherein, in response to the current detection unit detecting the current amplitude of the PWM output less than or equal to a predefined current, and the voltage detection unit detecting the voltage amplitude of the PWM output not equal to a predefined voltage, the feedback signal generation unit can generate a first feedback so that the PWM power source can receive the first feedback signal from the feedback signal input terminal to adjust the voltage amplitude of the PWM output to be equal to the predefined voltage.

6. The power system as claimed in claim 5, wherein the feedback signal generation unit can generate the first feedback signal based on the signal indicating the voltage amplitude of the PWM output received from the voltage detection unit.

7. The power system as claimed in claim 6, wherein the PWM power source can increase the current amplitude of the PWM output based on the first feedback signal received by the feedback signal input terminal.

* * * * *